(12) United States Patent
Bailey et al.

(10) Patent No.: US 12,740,665 B2
(45) Date of Patent: Sep. 22, 2026

(54) AUTOMATIC PORTAFILTER CLAMPING DEVICE FOR ESPRESSO MACHINES

(71) Applicants: Spencer Bailey, Seattle, WA (US); Olaf Bergeson, Seattle, WA (US)

(72) Inventors: Spencer Bailey, Seattle, WA (US); Olaf Bergeson, Seattle, WA (US)

( * ) Notice: Subject to any disclaimer, the term of this patent is extended or adjusted under 35 U.S.C. 154(b) by 1068 days.

(21) Appl. No.: 17/832,646

(22) Filed: Jun. 5, 2022

(65) Prior Publication Data

US 2023/0389744 A1 Dec. 7, 2023

(51) Int. Cl.
*A47J 31/44* (2006.01)
*A47J 31/06* (2006.01)

(52) U.S. Cl.
CPC ....... *A47J 31/4464* (2013.01); *A47J 31/0684* (2013.01)

(58) Field of Classification Search
CPC .................................................. A47J 31/4464
USPC .......................................................... 99/323
See application file for complete search history.

(56) References Cited

U.S. PATENT DOCUMENTS 3,986,346 A * 10/1976 Doat ........................ B01D 9/04 426/384
5,463,933 A * 11/1995 Landais .................. A46J 31/14 99/285
5,791,888 A * 8/1998 Smith ................... F01C 21/104 418/259
6,192,786 B1 * 2/2001 Gasser ................ A47J 31/4464 99/323
10,258,190 B2 * 4/2019 Ait Bouziad ....... A47J 31/0668
10,881,240 B2 * 1/2021 Grassia ................... A47J 31/38
2005/0076789 A1 * 4/2005 Tebo ................... A47J 31/4496 99/279
2011/0223302 A1 * 9/2011 Star ......................... A47J 31/06 99/279
2014/0216266 A1 * 8/2014 Ruhl ................... A47J 31/0663 99/300
2015/0230652 A1 * 8/2015 Chalk ..................... A47J 31/34 99/295
2016/0051081 A1 * 2/2016 Grassia ............... A47J 31/4403 99/280
2016/0296050 A1 * 10/2016 Lane ......................... A45F 3/18
2018/0168388 A1 * 6/2018 Kim ........................ A47J 31/44

FOREIGN PATENT DOCUMENTS

WO WO 2019/003147 A1 * 3/2019 .............. A47J 21/52

* cited by examiner

*Primary Examiner* — Topaz L. Elliott
*Assistant Examiner* — Solan Oliva
(74) *Attorney, Agent, or Firm* — Alloy Patent Law; Walker Griffin Weitzel

(57) ABSTRACT

Presented is an automatic portafilter clamping device for clamping a portafilter to a coffee machine. The automatic portafilter clamping device includes a support ring connected to the group head assembly of the coffee machine, and a compression ring configured to rotate relative to the support ring. The compression ring could be rotated relative to the support ring to bring the compression ring in either a locked position or an unlocked position. A rotation assembly is configured to rotate the compression ring relative to the support ring. The automatic portafilter clamping device effectively and efficiently seals a portafilter against the group head gasket with minimal friction related wear.

15 Claims, 11 Drawing Sheets

AUTOMATIC PORTAFILTER CLAMPING DEVICE FOR ESPRESSO MACHINES

TECHNICAL FIELD OF INVENTION

The present invention generally relates to coffee machines and more particularly, it pertains to a fastening device to removably connect the portafilter to the espresso machine.

BACKGROUND

Espresso coffee is a brewed drink that is generally prepared using hot water and finely-ground coffee beans. Nowadays, espresso coffee machines are quite popular in modern life due to their ease of use, high taste quality of produced beverage, and ability to brew espresso coffee in a relatively quick time.

Often, espresso coffee machines require a removable portafilter that holds the ground espresso beans (coffee grounds) prior to and during the brewing process. The portafilter allows hot water to mix with the ground espresso beans (coffee grounds), thereby producing espresso drinks. Portafilters are readily installed and removed multiple times by the operator to prepare various kinds of espresso drinks.

Current portafilter designs require the operator to sharply pull and/or push the portafilter in an awkward position to install and remove the portafilter into the espresso machine. The continued pull and/or push motion can cause user fatigue, especially in professional or commercial situations where the operator is doing this motion several hundred or thousands of times per day. Additionally, most current portafilter designs require the portafilter to twist onto the gasket while compressing enough to make a sealed surface to prevent leakage of coffee contents. Thus, the group head gasket could quickly wear out in a conventional espresso machine, rendering the espresso machine inefficient and leaking coffee contents during use.

Various devices have been attempted in the prior art to solve the above-mentioned problem. For example, US20200146508A1 discloses a coffee grinding apparatus having a holder assembly configured to retain various sized portafilter assemblies for receiving grounds from the coffee grinding apparatus. The holder assembly for a coffee grinding apparatus includes a stem with front and rear portions and a bracket having a first portion extending outwardly from the front portion of the stem and a second portion extending downwardly from the first portion. The second portion of the bracket includes an inwardly facing abutment surface. A head portion is operably coupled to the stem and includes an upright sidewall with an outwardly facing abutment surface disposed on the sidewall.

The existing prior art(s) do not provide an effective solution due to their cumbersome design and difficulty in use. Thus, there is a need for an automatic portafilter clamping device for clamping a portafilter to a coffee machine that effectively and efficiently clamps the portafilter to the coffee machine without substantially damaging the group head gasket and without leaking coffee contents during use.

BRIEF SUMMARY

Before the present systems and methods are described, it is to be understood that this application is not limited to the particular systems, and methodologies described, as there can be multiple possible embodiments that are not expressly illustrated in the present disclosures. It is also to be understood that the terminology used in the description is for the purpose of describing the particular versions or embodiments only, and is not intended to limit the scope of the present application.

It is an object of the present invention to provide an automatic portafilter clamping device that is configured to clamp a typical portafilter already known in the art to the coffee machine.

It is an object of the present invention to provide an automatic portafilter clamping device that allows the group head gasket of the coffee machine to be made up of a softer material.

It is an object of the present invention to provide an automatic portafilter clamping device that effectively and efficiently seals the portafilter against the group head gasket with minimal friction-related wear.

It is an object of the present invention to provide an automatic portafilter clamping device that is electrically powered to substantially reduce the manual labour and effort of the operator.

Embodiments of the present invention disclose an automatic portafilter clamping device for clamping a portafilter to a coffee machine comprising: A support ring connected to group head assembly of the coffee machine; wherein the support ring comprises a groove and a plurality of inner cuts; A compression ring configured to be rotatable relative to the support ring; wherein the compression ring is rotated in a groove of the support ring; wherein the compression ring comprises a plurality of diametrically opposed ribs disposed in the inner periphery of the compression ring; wherein the compression ring could be rotated to bring the compression ring in either a locked position or an unlocked position; Wherein in the locked position, the plurality of diametrically opposed ribs at least substantially overlies on the plurality of inner cuts such that the plurality of diametrically opposed ribs are sandwichingly disposed between a plurality of ears of the portafilter and the plurality of inner cuts, thereby effectively locking the portafilter relative to the group head assembly of the coffee machine; Wherein in the unlocked position, the plurality of diametrically opposed ribs does not overlies on the plurality of inner cuts; A rotation assembly configured to rotate the compression ring in the groove of the support ring.

In an embodiment, the coffee machine is an espresso machine.

In an embodiment, the support ring is detachably connected to group head assembly of the coffee machine through fasteners.

In an embodiment, the groove is defined as radial space between the inner wall and an outer wall of the support ring.

In an embodiment, each of the plurality of diametrically opposed ribs comprises a ramp element to facilitate lift up of the portafilter.

In an embodiment, the rotation assembly comprises an electric motor.

In an embodiment, the rotation assembly is a manually driven handle.

In an embodiment, the rotation assembly comprises a power transmission assembly to transmit rotational power from the rotation assembly to the compression ring; wherein the power transmission assembly is selected from the group consisting of lead screw, ball screw, piston and cylinder arrangement, rack and pinion gear arrangement, gear mechanism and manual actuators.

In an embodiment, the automatic portafilter clamping device comprises an optical sensor that senses the presence of the portafilter when it is inserted into the coffee machine.

In an embodiment, the automatic portafilter clamping device comprises a push-button that unlocks the portafilter upon the actuation of the button.

In an embodiment, the electric motor comprises a motor control circuit that senses if the portafilter is clamped properly and then accordingly stops the motor.

In an embodiment, the automatic portafilter clamping device comprises an electronic control circuit.

In an embodiment, the automatic portafilter clamping device further comprises a manual input interface to manually control the operation of the electronic control circuit of the automatic portafilter clamping device.

Various objects, features, aspects and advantages of the present invention will become more apparent from the following detailed description of the embodiments of the invention, along with the accompanying drawings in which like numerals represent like components.

BRIEF DESCRIPTION OF THE DRAWINGS

The foregoing summary, as well as the following detailed description of preferred embodiments, is better understood when read in conjunction with the appended drawings. There is shown in the drawings of example embodiments, however, the application is not limited to the specific system and method disclosed in the drawings.

DETAILED DESCRIPTION

Some embodiments, illustrating its features, will now be discussed in detail. The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any methods and systems similar or equivalent to those described herein can be used in the practice or testing of embodiments, the preferred methods, and systems are now described. The disclosed embodiments are merely exemplary.

The various features and embodiments of an automatic portafilter clamping device 100 of the present invention will now be described in conjunction with the accompanying figures, namely FIGS. 1-11.

Figure 1:
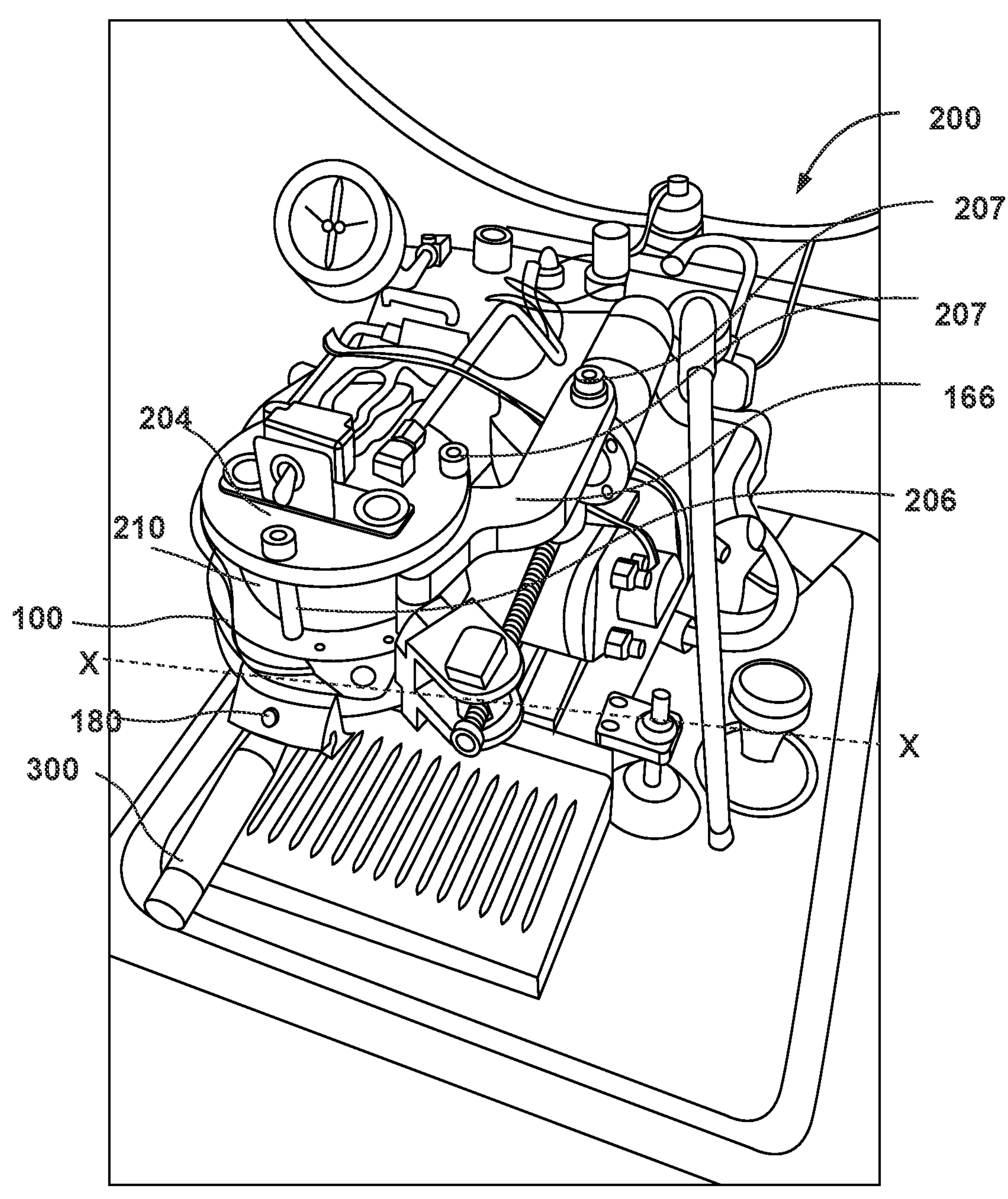
FIG. 1 illustrates a perspective view of an espresso machine comprising an automatic portafilter clamping device in a locked position, wherein a conventional portafilter is shown to be clamped to the automatic portafilter clamping device of the espresso machine, according to an embodiment of the present invention.

FIG. 1 illustrates a perspective view of an espresso machine 200 comprising an automatic portafilter clamping device 100 in a locked position, according to an embodiment of the present invention. As shown in FIG. 1, the automatic portafilter clamping device 100 of the espresso machine 200 is clamping a portafilter 300 for use in espresso coffee production. The espresso machine 200 comprises conventional components including but not limited to: a steam control unit, hot water/steam generation system, optional milk supply system, water reservoir/supply unit, drip trays, various sensors, and so on useful for efficient operation of the espresso machine 200. The espresso machine 200 further comprises a group head assembly 210 and an automatic portafilter clamping device 100 which will be described in greater detail in the below description. As shown in FIG. 1, the automatic portafilter clamping device 100 is detachably connected to a bayonet ring 204 through a plurality of fasteners 206. In an embodiment as shown in FIG. 1, the group head assembly 210 is integrally connected (formed) to the bayonet ring 204 such that group head assembly 210 comprises an integrally formed bayonet ring 204.

Figure 2:
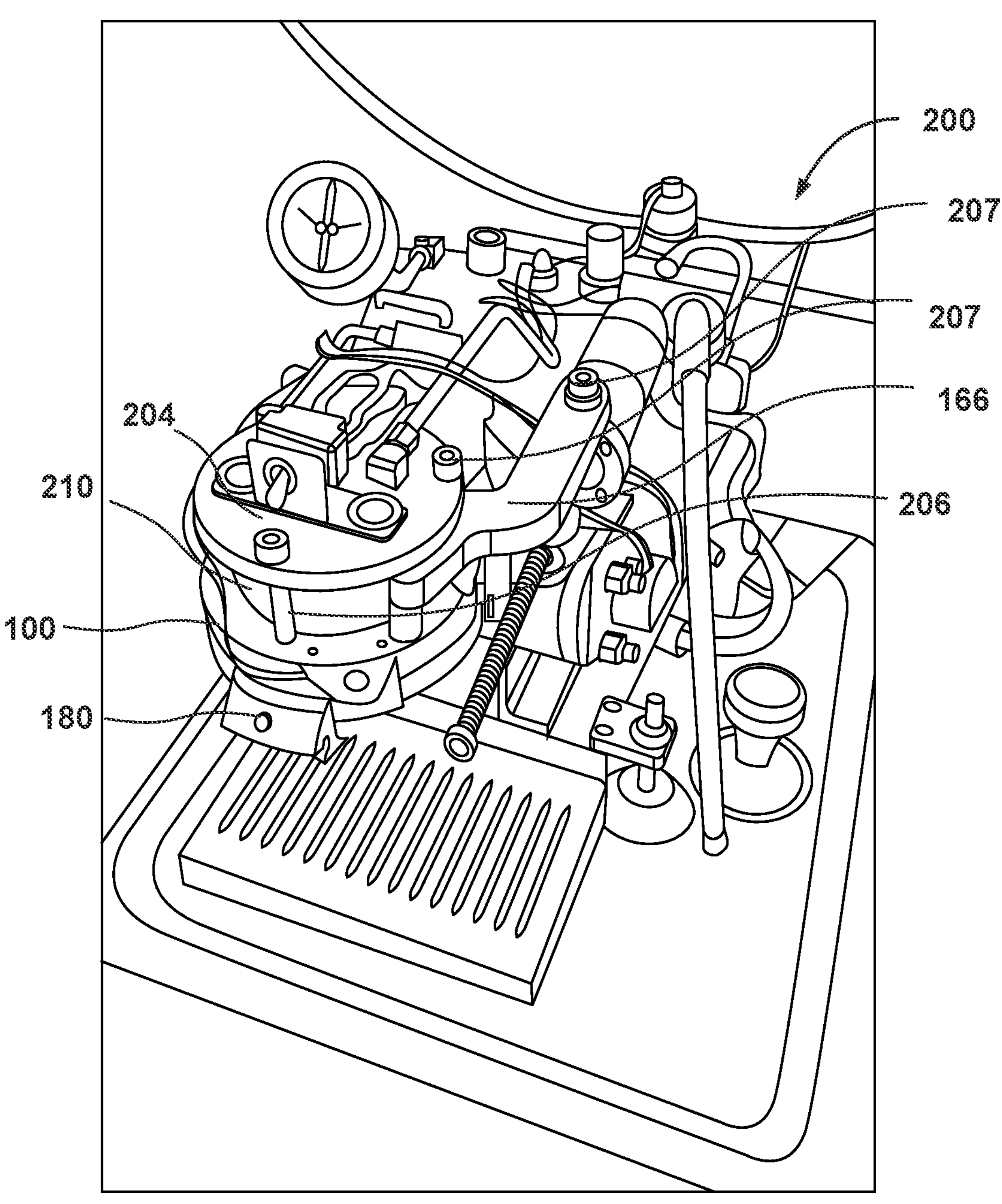
FIG. 2 illustrates a perspective view of an espresso machine of FIG. 1 comprising an automatic portafilter clamping device in an unlocked position.

FIG. 2 illustrates a perspective view of an espresso machine 200 comprising an automatic portafilter clamping device 100 in an unlocked position. In the unlocked position, the portafilter 300 is released from the espresso machine 200 by operating the automatic portafilter clamping device 100 will be described in greater detail in the below description.

Figure 3:
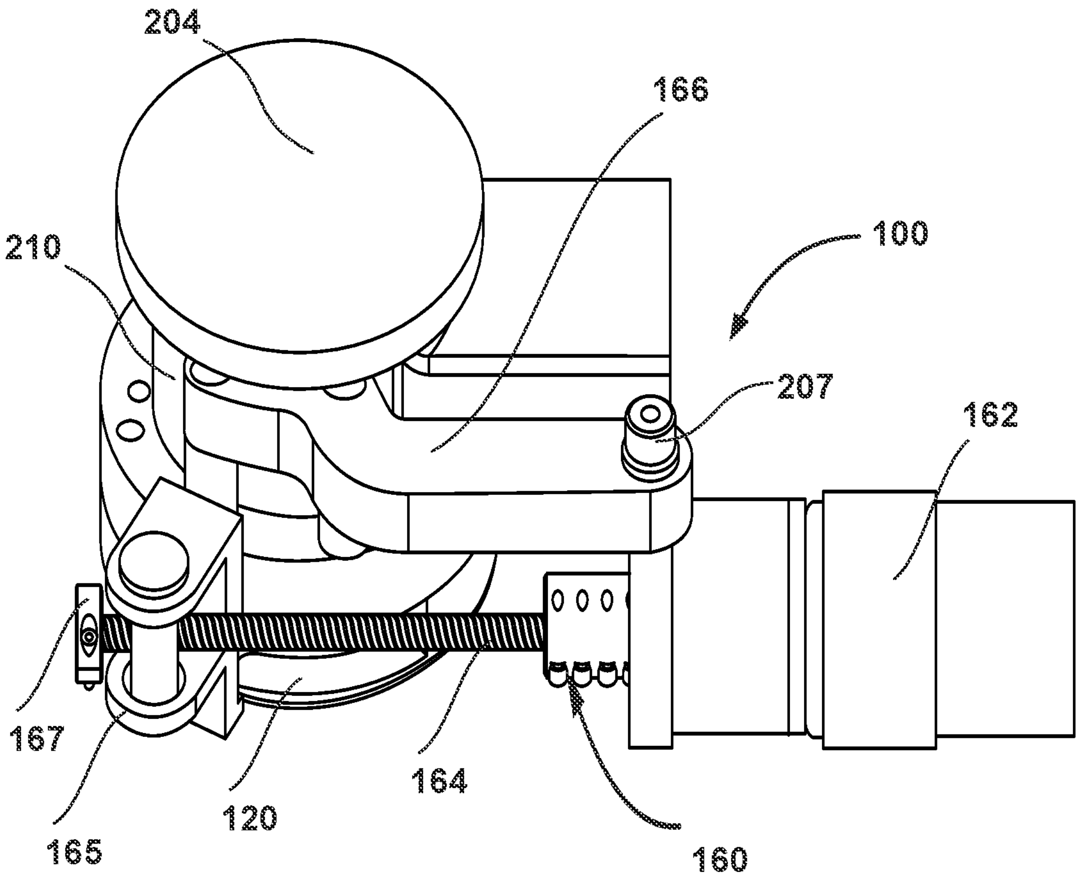
FIG. 3 illustrates a perspective view of an automatic portafilter clamping device of the espresso machine of FIG. 1.
Figure 4:
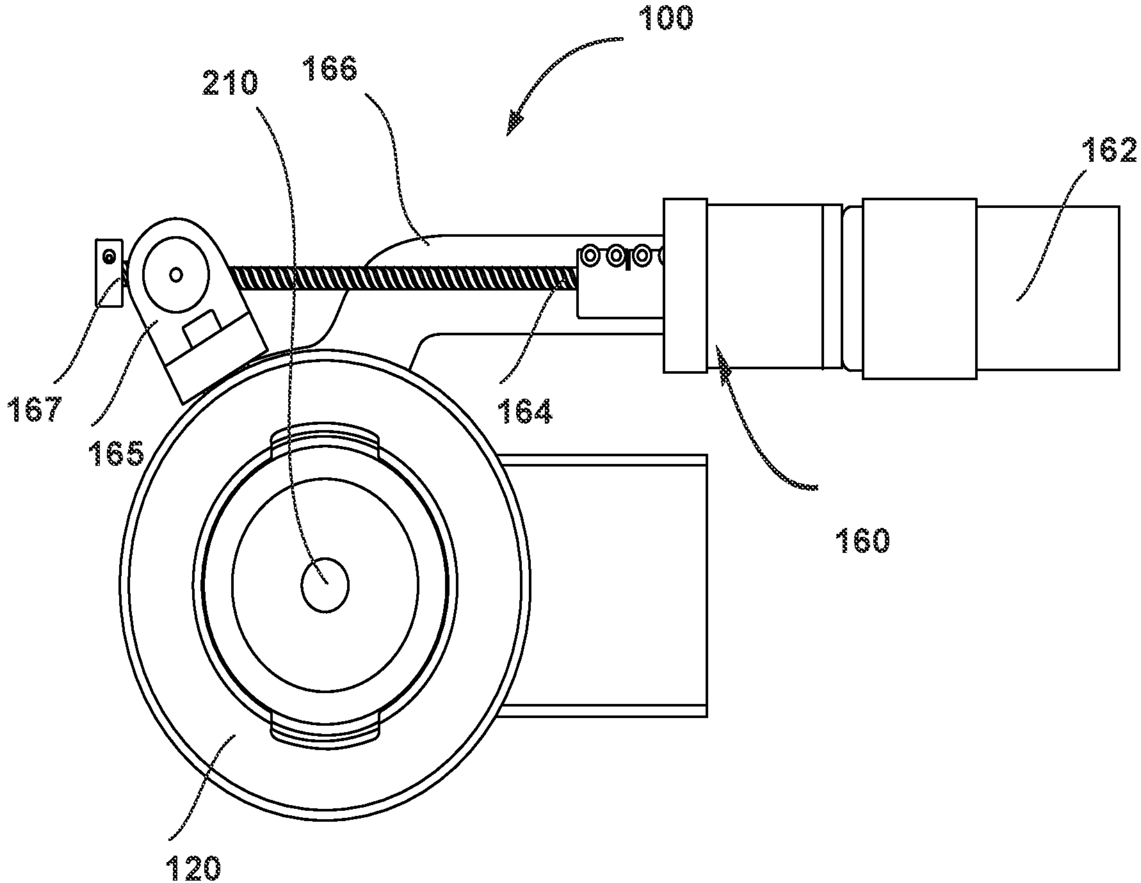
FIG. 4 illustrates a bottom view of an automatic portafilter clamping device of FIG. 3.

FIG. 3 and FIG. 4 illustrate a perspective view and a bottom view of an automatic portafilter clamping device 100 of the espresso machine 200 respectively. The automatic portafilter clamping device 100 is configured to selectively clamp and release a portafilter 300 to a coffee machine 200. As seen in FIG. 3 and FIG. 4, the automatic portafilter clamping device 100 is arranged in the locked position. The automatic portafilter clamping device 100 comprises a support ring 120 connected to group head assembly 210 of the coffee machine 200, a compression ring 140 (FIG. 8) configured to be rotatable relative to the support ring 120. The compression ring 140 (FIG. 8) could be rotated to bring the compression ring 140 (FIG. 8) in either a locked position (FIG. 1) or an unlocked position (FIG. 2). The automatic portafilter clamping device 100 further comprises a rotation assembly 160 configured to rotate the compression ring 140 relative to the support ring 120. In an embodiment as shown in FIG. 3 and FIG. 4, the rotation assembly 160 comprises an electric motor 162.

Figure 11:
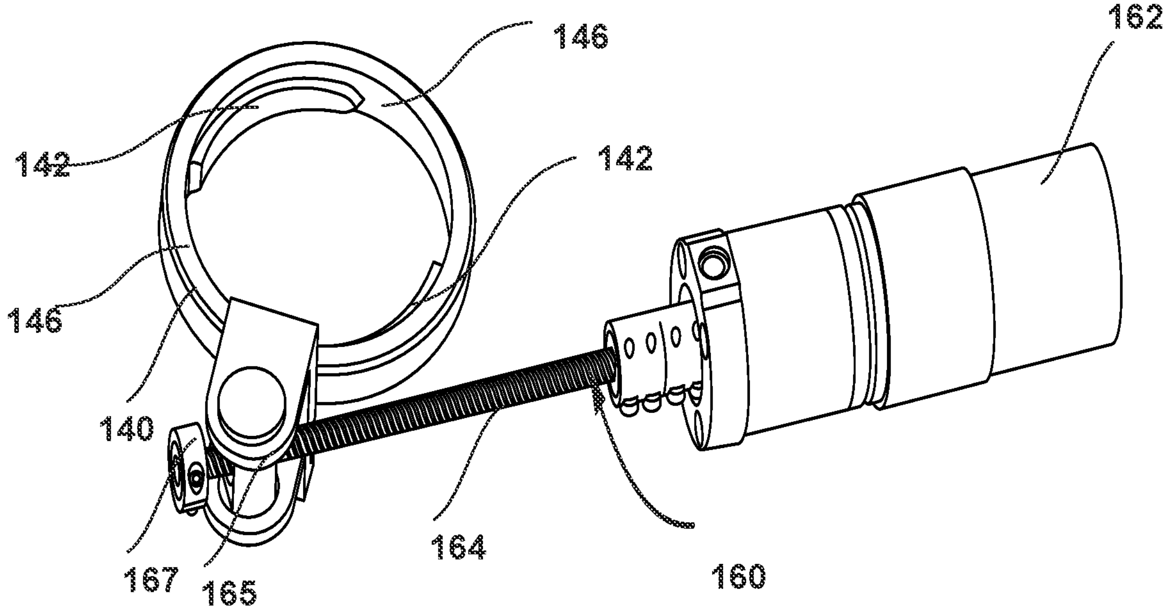
FIG. 11 illustrates a rotation assembly configured to rotate the compression ring of the automatic portafilter clamping device of FIG. 3, according to an embodiment of the present invention.

The rotation assembly 160 comprises a power transmission assembly to transmit rotational power from the rotation assembly 160 to the compression ring 140. In an embodiment as shown in FIG. 3, FIG. 4, and FIG. 11, the power transmission assembly is a single-stage lead screw 164. One end of the lead screw 164 is rotatably connected to the electric motor 162. A bearing 167 (i.e. stop element) is disposed on the opposite second side of the lead screw 164. The lead screw 164 is further connected to a U-shaped link 165. The U-shaped link 165 is further connected to an attachment portion 145 (FIG. 8) of a compression ring 140 (FIG. 8) wherein the U-shaped link 165 is a clevis fastener. Referring to FIG. 1 and FIG. 3, the electric motor 162 is further connected to the bayonet ring 204 through a plurality of fasteners 207 and a link 166.

In another embodiment (not shown in figures), the rotation assembly 160 is a manually driven handle (actuator) (not shown in figures) that could be manually driven by an operator to rotate the compression ring 140 relative to the support ring 120. The manually driven handle (actuator) (not shown in figures) is connected to the compression ring 140. This configuration provides a simpler and cheaper alternative as it saves money and reduces design complexities associated with electrical motors and related electrical systems. This configuration is also useful in environments where electricity is not readily available for use.

Figure 5:
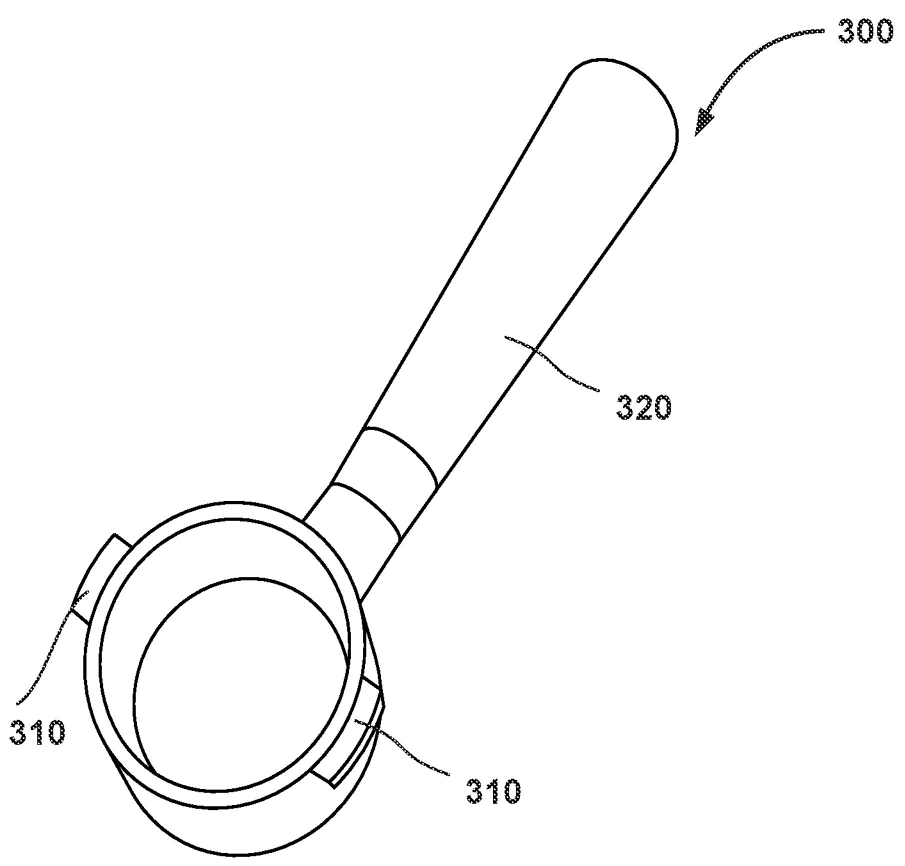
FIG. 5 illustrates a perspective view of a typical portafilter of the espresso machine of FIG. 1.

Referring to FIG. 5, a typical portafilter 300 is described in detail. The portafilter 300 comprises a plurality of ears 310 to enable clamping and releasing of the portafilter 300 to the espresso machine 200. The portafilter 300 further comprises a handle 320. The portafilter 300 also comprises conventional parts/components (not illustrated in figures) such as but not limited to filter basket, springs, screws and seals, and so on.

Figure 6:
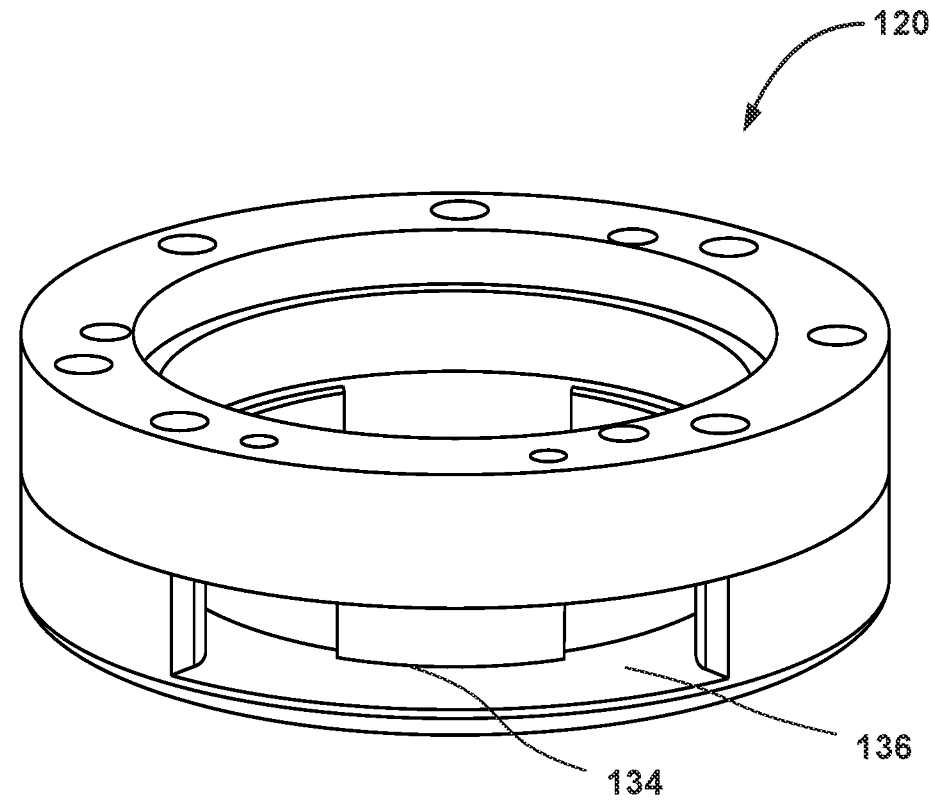
FIG. 6 illustrates a perspective view of a support ring of the automatic portafilter clamping device of FIG. 3.
Figure 7:
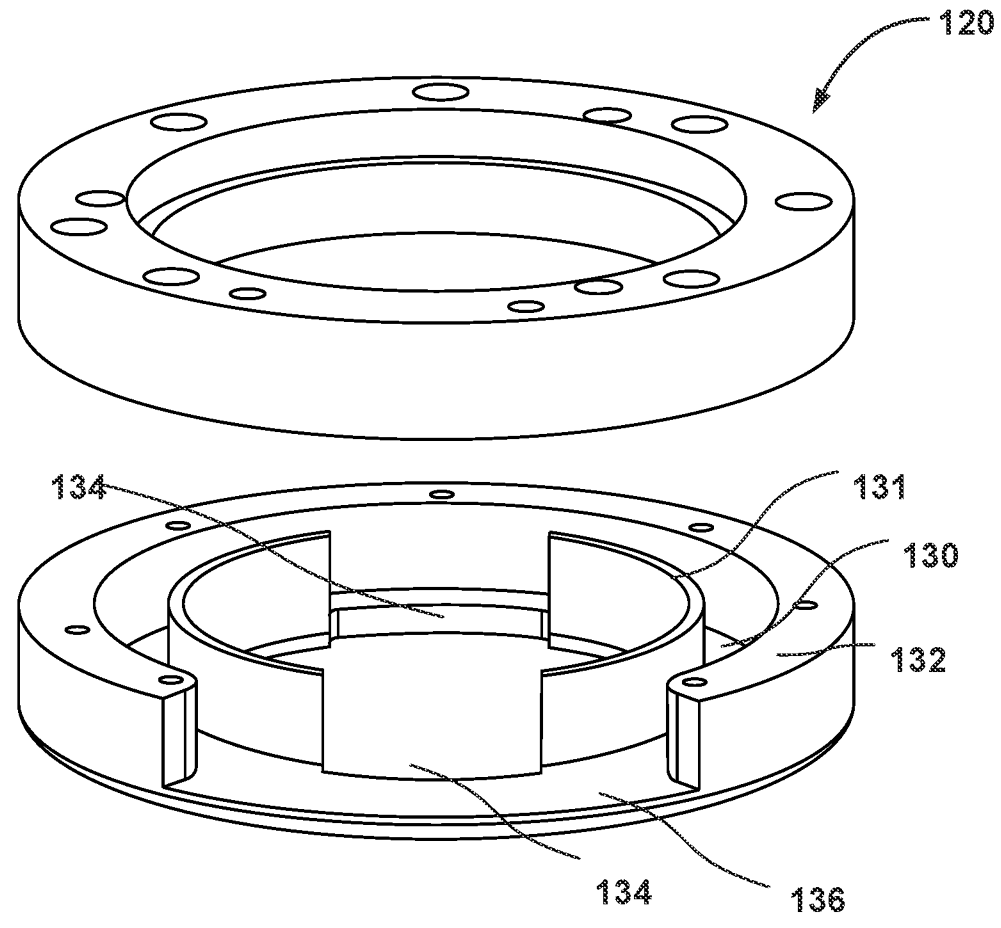
FIG. 7 illustrates an exploded view of the support ring of FIG. 6.

FIG. 6 and FIG. 7 illustrate a perspective view and an an exploded view of a support ring 120 respectively. The support ring 120 comprises an inner wall 131, an outer wall 132, and a plurality of inner cuts 134. The inner wall 131 and the plurality of inner cuts 134 define an insertion passage for the plurality of ears 310 (FIG. 5) of the portafilter 300 (FIG. 5). A groove 130 is defined as radial space between the inner wall 131 and an outer wall 132 of the support ring 120 such that a compression ring 140 (FIG. 8) is rotated in a groove 130 of the support ring 120. As shown in FIG. 6 and FIG. 7, the outer wall 132 has a substantially circular shape. An open window 136 defines the overall angular range (degree) of rotation of the attachment portion 145 (FIG. 8) of the compression ring 140 (FIG. 8) wherein the open window 136 is defined as distance between the opposite edges of the outer wall 132. As shown in FIG. 6 and FIG. 7, the open window 136 forms up to 90 degrees of the circumference of the support ring 120. However, in various embodiments (not shown in figures), the open window 136 could have any angle such as 30 degrees, 45 degrees, 60 degrees, 120 degrees, 180 degrees and so on.

Figure 8:
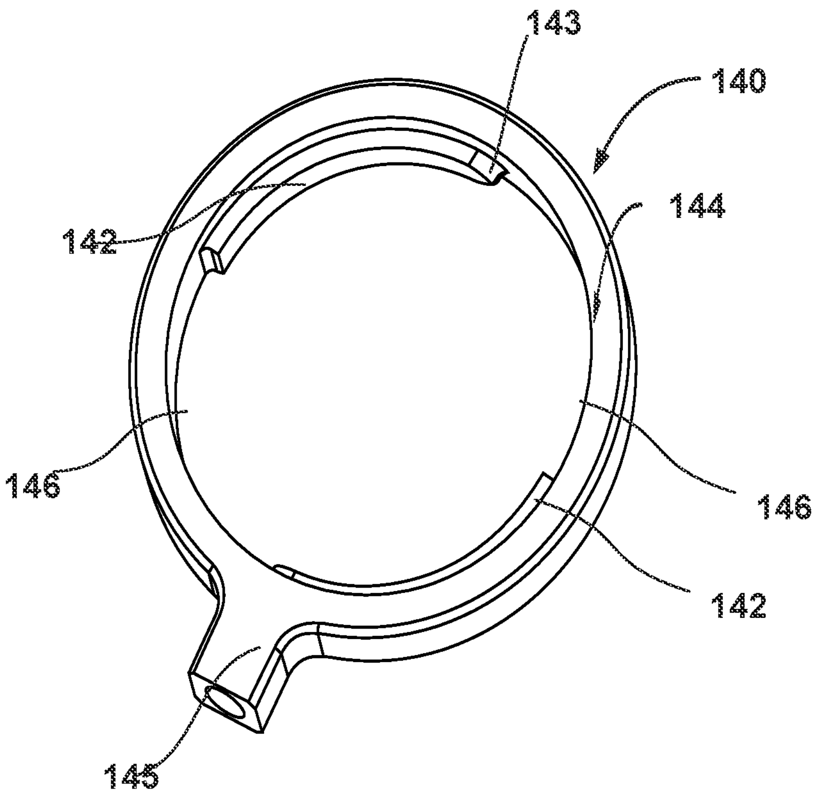
FIG. 8 illustrates various perspective views of a compression ring of the automatic portafilter clamping device of FIG. 3.
Figure 8:
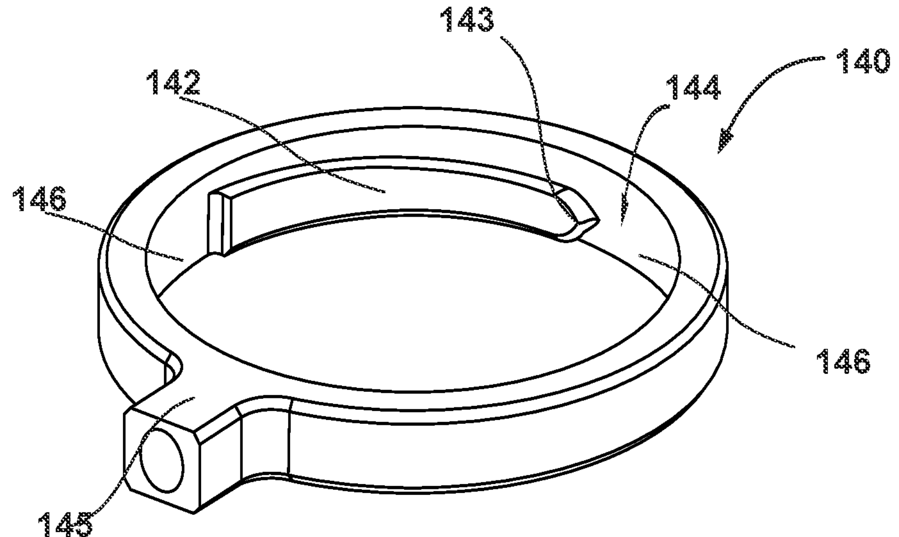

FIG. 8 illustrates various perspective views of a compression ring 140. As shown in FIG. 8, the compression ring 140 comprises a plurality of diametrically opposed ribs 142 disposed of in the inner periphery 144 of the compression ring 140. Each of the plurality of diametrically opposed ribs 142 are substantially inclined in nature to allow uplift and down lift of the portafilter 300 relative to the support ring 120 (FIG. 7), when the compression ring 140 is rotated in two opposite directions respectively. A void region is defined as a region that does not include the plurality of diametrically opposed ribs 142. Thus, the plurality of diametrically opposed ribs 142 and the void region 146 together define a complete circle of the inner periphery 144 of the compression ring 140. Each of the plurality of diametrically opposed ribs 142 comprises a ramp element 143 to facilitate the lift up of the portafilter 300. The shape of ramp element 143 is substantially wedge-shaped, thus, enabling gradual uplift and down lift of the portafilter 300 relative to the support ring 120 (FIG. 7), when the compression ring 140 is rotated in two opposite directions respectively. The compression ring 140 comprises an attachment portion 145 for connection of U-shaped link 165 (FIG. 3) with the compression ring 140.

Figure 9:
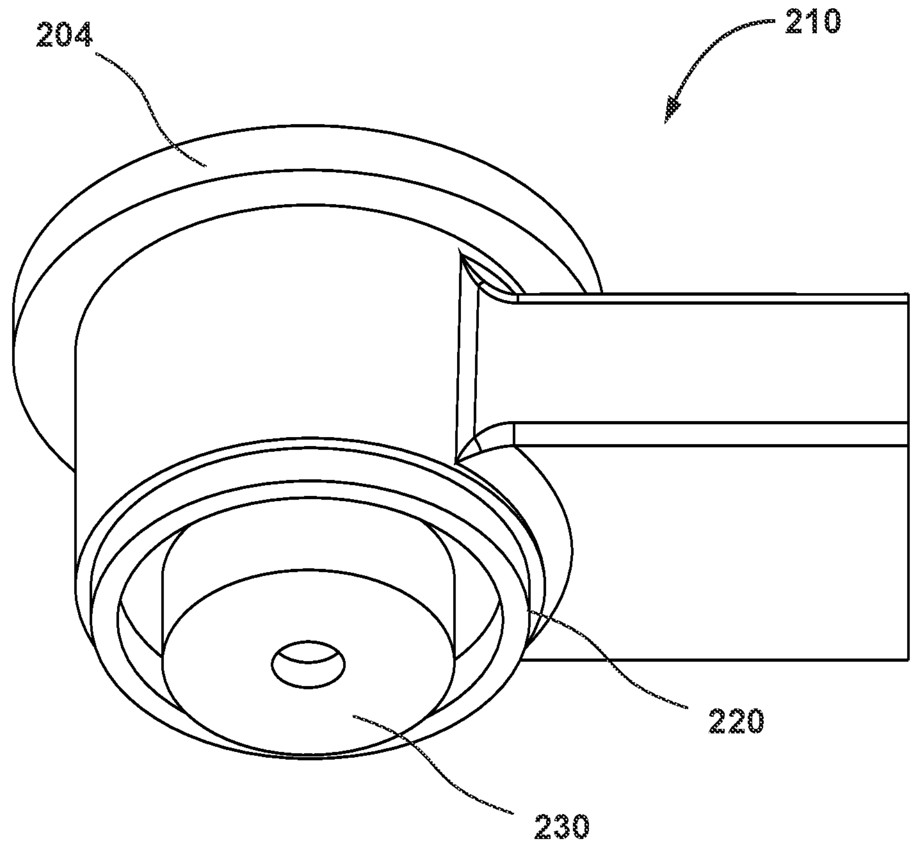
FIG. 9 illustrates a group head assembly of the automatic portafilter clamping device of FIG. 3.

FIG. 9 illustrates a group head assembly 210 of the automatic portafilter clamping device 100. The group head assembly 210 comprises a group head gasket 220 which contacts and seals the portafilter 300 (FIG. 5) against the group head gasket 220 when the automatic portafilter clamping device 100 (FIG. 1) is in the locked position. The group head assembly 210 further comprises a group head shower screen 230 that distributes the pressurized water evenly over the surface of the portafilter 300 (FIG. 5). The group head assembly 210 comprises an integrally formed bayonet ring 204.

Figure 10:
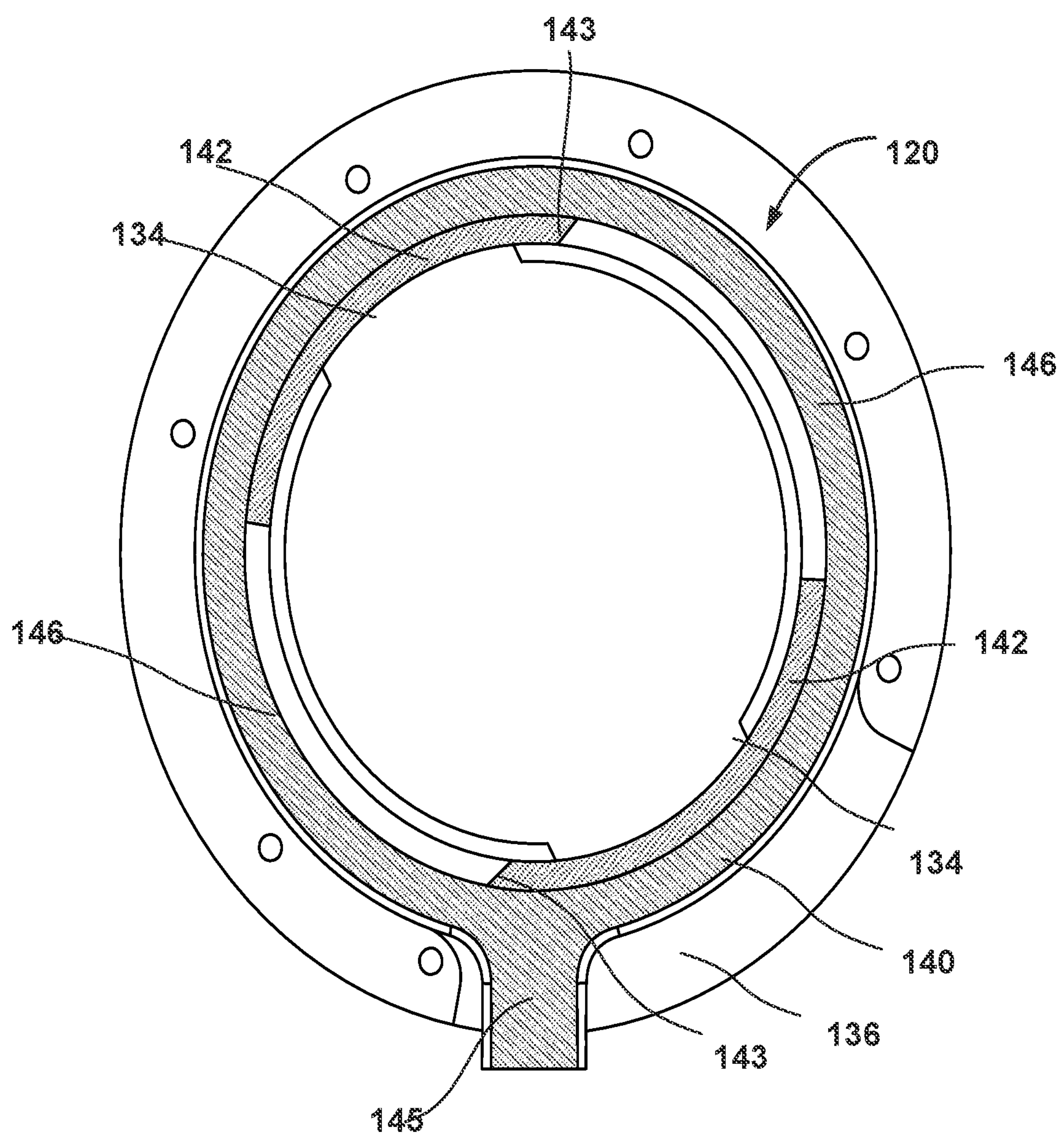
FIG. 10 illustrates a sectional view taken along lines X-X of FIG. 1, showing a compression ring arranged in the support ring in the locked position and wherein the portafilter is removed for sake of simplicity and ease of understanding.

FIG. 10 illustrates a sectional view of a compression ring 140 arranged in the support ring 120 in the locked position. As shown in FIG. 10, the plurality of diametrically opposed ribs 142 at least substantially overlies on the plurality of inner cuts 134 such that the plurality of diametrically opposed ribs 142 are sandwichingly disposed between a plurality of ears 310 (FIG. 5) of the portafilter 300 (FIG. 5) and the plurality of inner cuts 134, thereby effectively locking the portafilter 300 (FIG. 5) relative to the group head assembly 210 (FIG. 9) of the coffee machine 200 (FIG. 1).

An exemplary method of using the automatic portafilter clamping device 100 will now be described in detail in reference to FIGS. 1-11.

Initially, the espresso machine 200 is kept in an unlocked position as shown in FIG. 2. In the unlocked position, the plurality of diametrically opposed ribs 142 of the compression ring 140 does not overlies on the plurality of inner cuts 134 of the support ring 120. In the unlocked position, the void region 146 of the compression ring 140 overlies on the plurality of inner cuts 134 of the support ring 120.

Then, afterward, to bring the compression ring 140 and/or automatic portafilter clamping device 100 in the locked position, firstly, the portafilter 300 is brought just below the support ring 120 such that the plurality of ears 310 of the portafilter 300 are received in the plurality of inner cuts 134 of the support ring 120. Afterward, the electric motor 162 of the rotation assembly 160 is actuated in a specific direction which rotates the lead screw 164 in a specific (i.e clockwise) direction. Due to the rotation of the lead screw 164 in a specific (i.e clockwise) direction, the U-shaped link 165 is longitudinally moved towards the opposite end of the lead screw 164. The U-shaped link 165 is further connected to the compression ring 140 wherein the compression ring 140 is arranged in the groove 130 of the support ring 120. Thus, the longitudinal movement of the U-shaped link 165 is converted into the rotational motion of the compression ring 140 due to the configuration of the compression ring 140 and the support ring 120. As the compression ring 140 is rotated relative to the support ring 120, the ramp element 143 of the diametrically opposed ribs 142 of the compression ring 140 comes into contact with the plurality of ears 310 of the portafilter 300. Due to wedging action of the ramp element 143, the plurality of ears 310 of the portafilter 300 are pushed upwards towards the group head gasket 220 of the group head assembly 210. Further rotation of the lead screw 164 in the same direction by the electric motor 162 assists in stable locking and hence effective sealing of the portafilter 300 against the group head gasket 220 as seen in FIG. 10.

To bring back the compression ring 140 and/or automatic portafilter clamping device 100 in the unlocked position, the above-mentioned steps are merely repeated in reverse order with little to no variation. Thus, by actuating the electric motor 162 of the rotation assembly 160 in an opposite direction and hence, by rotating the lead screw 164 in a second opposite (i.e. counter-clockwise) direction, the portafilter 300 could be removed from the espresso machine 200 and/or automatic portafilter clamping device 100 for various purposes such as including but not limited to refilling the coffee contents in the portafilter 300, cleaning/service of the portafilter 300 and/or replacement of the portafilter 300.

In another embodiment, the automatic portafilter clamping device 100 comprises an electronic control circuit (not shown in figures). The electronic control circuit (not shown in figures) comprises an optical sensor (not shown in figures) that senses the presence of the portafilter 300 when it is clamped to the coffee machine 200 in the locked position. The electronic control circuit (not shown in figures) further comprises a push button 180 that unlocks the portafilter 300 upon the actuation of the push button 180. The actuation of the push button 180 actuates the electric motor 162 such that which rotates the lead screw 164 in a direction (counter clockwise direction), bringing the compression ring 140 in the unlocked position, and thus, the portafilter 300 could be easily removed from the espresso machine 200. The electric motor 162 comprises a motor control circuit (not shown in figures) that senses if the portafilter 300 is clamped properly or not. After the portafilter 300 is clamped properly, the motor control circuit (not shown in the figures) accordingly stops the electric motor 162. This configuration allows the prevention of the jamming of the electric motor 162 once the portafilter 300 is clamped properly. The motor control circuit (not shown in figures) is electrically connected to end stop switches (not shown in figures). The end stop switches (not shown in figures) are disposed of on opposite edges of the outer wall 132. The end stop switches (not shown in figures) detect movement of the attachment portion 145 relative to the opposite edges of the outer wall 132 and thus, sense when the attachment portion 145 is positioned (moved) in close proximity of opposite edges of the outer wall 132. A manual input interface (not shown in figures) is operably connected to the electronic control circuit (not shown in figures) to enable manual control of the operation of the electronic control circuit (not shown in figures). The rotation of electric motor 162 can be adjusted by turning a control knob (not shown in figures) or by adjusting the rotation of electric motor 162 through the electronic control circuit (not shown in figures) by providing manual data inputs through the manual input interface. Thus, the degree of clamping force exerted by the electric motor 162 on the portafilter 300 could be adjusted depending on the requirement of the operator.

It should be understood that the term “locking position” is a broad term and the locking position broadly includes clamping of the portafilter 300 to the espresso machine 200 using the automatic portafilter clamping device 100. Thus, broadly speaking, the locking position of the espresso machine 200, the locking position of the automatic portafilter clamping device 100, and the locking position of the compression ring 140 are similar terms and have a similar meaning and could be used interchangeably with one another.

It should be understood that the espresso machine 200 is considered in various embodiments of the present invention wherein the espresso machine 200 produces espresso coffee beverages. However, it should be understood that other types of beverage-making machines could also be considered for the present invention that uses a portafilter for preparing various types of beverages such as but not limited to tea, latte, Cappuccino, Black coffee, Americano, Doppio, Lungo, Mocha and so on.

Referring to FIGS. 1-11, the number of the plurality of diametrically opposed ribs 142 of the compression ring 140, the number of plurality of ears 310 of the portafilter 300, and the number of the plurality of inner cuts 134 of the support ring 120 are equal and is exactly two in number. However, it should be understood that the number of plurality of diametrically opposed ribs 142 of the compression ring 140, the number of the plurality of ears 310 of the portafilter 300, and the number of the plurality of inner cuts 134 of the support ring 120 could be equal and more than two, such as but not limited to: three, four, five, six and so on. Broadly speaking, the automatic portafilter clamping device 100 could effectively and efficiently function using any number (greater than one) of the plurality of diametrically opposed ribs 142 of the compression ring 140, the plurality of ears 310 of the portafilter 300, and the plurality of inner cuts 134 of the support ring 120 with little to no variation.

Referring to FIGS. 1-11, the support ring 120 of the automatic portafilter clamping device 100 is detachably connected to a bayonet ring 204 through a plurality of fasteners 206 wherein the bayonet ring 204 is integrally connected formed with the espresso machine 200. However, It should be understood that the bayonet ring 204 could be non-integrally connected (later assembled) in the espresso machine 200. This arrangement allows the use of the automatic portafilter clamping device 100 to the espresso machine 200 that does not have an integrally formed bayonet ring 204. Firstly, the bayonet ring 204 is retro-fittingly installed in the espresso machine 200 and then later, the support ring 120 of the automatic portafilter clamping device 100 is detachably connected to a bayonet ring 204 through a plurality of fasteners 206.

The automatic portafilter clamping device 100 of the present invention includes various components, parts thereof may be configured in many different shapes, and sizes and using different kinds of materials, including but not limited to metals, plastics, ceramics, composites, polymers, rubber, silicone and one should not construe these aspects to be a limiting factor for the invention disclosed herein.

It should be understood that the various components and assemblies of the various embodiments of automatic portafilter clamping device 100 of the present invention are similar and interchangeable. It is obvious to the one skilled in the art that the various components and assemblies of the automatic portafilter clamping device 100 of one embodiment of the present invention could be considered for other embodiments with little or no variation.

It should be understood according to the preceding description of the present invention that the same is susceptible to changes, modifications and adaptations, and that the said changes, modifications and adaptations fall within scope of the appended claims.

What is claimed is:

1. An automatic portafilter clamping device (100) for clamping a portafilter (300) to a coffee machine (200) comprising:

a support ring (120) connected to a group head assembly (210) of the coffee machine (200); wherein the support ring (120) comprises a groove (130) and a plurality of inner cuts (134);

a compression ring (140) configured to rotate relative to the support ring (120); wherein the compression ring (140) is configured to rotate in a groove (130) of the support ring (120);

wherein the compression ring (140) comprises a plurality of diametrically opposed ribs (142) disposed of in the inner periphery (144) of the compression ring (140);

wherein the compression ring (140) could be rotated to bring the compression ring (140) into either a locked position or an unlocked position;

Wherein in the locked position, the plurality of diametrically opposed ribs (142) of the compression ring (140) at least substantially overlies on the plurality of inner cuts (134) of the support ring (120) such that the plurality of diametrically opposed ribs (142) of the compression ring (140) are sandwichingly disposed between a plurality of ears (310) of the portafilter (300) and the plurality of inner cuts (134) of the support ring (120), thereby effectively locking the portafilter (300) to the group head assembly (210) of the coffee machine (200);

wherein each of the plurality of diametrically opposed ribs (142) comprises a wedge-shaped ramp element (143) configured to engage corresponding ears (310) of the portafilter (300) to urge the portafilter (300) upward;

Wherein in the unlocked position, the plurality of diametrically opposed ribs (142) of the compression ring (140) are positioned away from the plurality of inner cuts (134) of the support ring (120); and wherein the rotation of the compression ring (140) engages the plurality of diametrically opposed ribs (142) with the plurality of ears (310) and presses the portafilter (300) upward into sealing engagement with the group head assembly (210); and a rotation assembly (160) configured to rotate the compression ring (140) in the groove (130) of the support ring (120).

2. The automatic portafilter clamping device (100) according to claim 1, wherein the coffee machine (200) is an espresso machine.

3. The automatic portafilter clamping device (100) according to claim 1, wherein the support ring (120) is detachably connected to the group head assembly (210) of the coffee machine (200) through fasteners (206).

4. The automatic portafilter clamping device (100) according to claim 1, wherein the groove (130) of the support ring (120) is defined as radial space between an inner wall (131) and an outer wall (132) of the support ring (120).

5. The automatic portafilter clamping device (100) according to claim 1, wherein the rotation assembly (160) comprises an electric motor (162).

6. The automatic portafilter clamping device (100) according to claim 1, wherein the rotation assembly (160) is a manually driven handle.

7. The automatic portafilter clamping device (100) according to claim 1, wherein the rotation assembly (160) comprises a power transmission assembly to transmit rotational power from the rotation assembly (160) to the compression ring (140);

wherein the power transmission assembly is selected from the group consisting of: lead screw, ball screw, piston and cylinder arrangement, rack and pinion gear arrangement, gear mechanism and manual actuators.

8. The automatic portafilter clamping device (100) according to claim 1, wherein the automatic portafilter clamping device (100) comprises an optical sensor that senses the presence of the portafilter (300) when it is inserted into the coffee machine (200).

9. The automatic portafilter clamping device (100) according to claim 1, wherein the automatic portafilter clamping device (100) comprises a push button (180) that unlocks the portafilter (300) upon the actuation of the push button (180).

10. The electric motor (162) according to claim 5, wherein the electric motor (162) comprises a motor control circuit that senses if the portafilter (300) is clamped properly and then accordingly stops the electric motor (162).

11. The automatic portafilter clamping device (100) according to claim 1, wherein the automatic portafilter clamping device (100) comprises an electronic control circuit.

12. The automatic portafilter clamping device (100) according to claim 1 or claim 10, wherein the automatic portafilter clamping device (100) further comprises a manual input interface to manually control the operation of the electronic control circuit of the automatic portafilter clamping device (100).

13. The automatic portafilter clamping device (100) according to claim 1, wherein the number of the plurality of diametrically opposed ribs (142) of the compression ring (140), the number of the plurality of ears (310) of the portafilter (300) and the number of the plurality of inner cuts (134) of the support ring (120) are equal and is exactly two in number.

14. The automatic portafilter clamping device (100) according to claim 1, wherein the support ring (120) is detachably connected to a bayonet ring (204).

15. The automatic portafilter clamping device (100) according to claim 14, wherein the bayonet ring (204) is retro-fittingly installed in the coffee machine (200).

* * * * *